US007991268B2

United States Patent
Sandblom

(10) Patent No.: US 7,991,268 B2
(45) Date of Patent: Aug. 2, 2011

(54) WIRELESS COMMUNICATION TERMINALS, SYSTEMS, METHODS, AND COMPUTER PROGRAM PRODUCTS FOR MEDIA FILE PLAYBACK

(75) Inventor: Daniel Sandblom, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1384 days.

(21) Appl. No.: 11/506,730

(22) Filed: Aug. 18, 2006

(65) Prior Publication Data

US 2008/0043685 A1    Feb. 21, 2008

(51) Int. Cl.
*H04N 9/80*     (2006.01)
*H04N 5/92*     (2006.01)
*G06F 3/00*     (2006.01)
*G06F 13/00*    (2006.01)
*H04N 5/445*    (2006.01)
*H04N 7/173*    (2006.01)

(52) U.S. Cl. ........ 386/248; 386/239; 386/240; 386/326; 725/46; 725/86; 725/87

(58) Field of Classification Search .............. 725/46, 725/86, 87; 386/95, 46, 123, 124, 125, 126, 386/248, 239, 240, 326
See application file for complete search history.

(56) References Cited

U.S. PATENT DOCUMENTS

| | | |
|---|---|---|
| 6,424,820 B1 | 7/2002 | Burdick et al. |
| 2001/0038702 A1 | 11/2001 | Lavoie et al. |
| 2002/0016165 A1 * | 2/2002 | Davies et al. ............... 455/414 |
| 2003/0012389 A1 | 1/2003 | Brice et al. |
| 2003/0227478 A1 | 12/2003 | Chatfield |
| 2004/0014426 A1 | 1/2004 | Moore |
| 2004/0136338 A1 | 7/2004 | Lin et al. |
| 2004/0158860 A1 * | 8/2004 | Crow ............................ 725/46 |
| 2004/0259581 A1 | 12/2004 | Crisler et al. |
| 2005/0107073 A1 | 5/2005 | Cheiky et al. |
| 2005/0283731 A1 * | 12/2005 | Saint-Hilaire et al. ........ 715/733 |
| 2006/0265349 A1 | 11/2006 | Hicken |
| 2007/0067160 A1 * | 3/2007 | Chen ........................... 704/200 |

FOREIGN PATENT DOCUMENTS

| | | |
|---|---|---|
| EP | 1 478 134 A1 | 11/2004 |
| EP | 1 615 464 A1 | 1/2006 |
| EP | 1 672 940 A1 | 6/2006 |
| WO | WO 2004/023841 A | 3/2004 |
| WO | WO 2005/112422 A1 | 11/2005 |

OTHER PUBLICATIONS

Jones et al., "Emerging Technologies," Language Learning and Technology, Jan. 2002, vol. 6 (1), pp. 6-10.

(Continued)

*Primary Examiner* — Thai Tran
*Assistant Examiner* — Daquan Zhao
(74) *Attorney, Agent, or Firm* — Myers Bigel Sibley & Sajovec, PA

(57) ABSTRACT

A wireless communication terminal includes a wireless communication module and a controller. The wireless communication module is configured to communicate with other communication terminals over a wireless interface. The controller is configured to establish a connection with at least one participant wireless communication terminal via the wireless communication module, and to operate in each of a direct mode and, alternatively, a play list mode.

21 Claims, 4 Drawing Sheets

OTHER PUBLICATIONS

Invitation to Pay Additional Fees for PCT/EP2007/051428 mailed Apr. 25, 2007.
International Search Report and the Written Opinion of the International Searching Authority for PCT Application No. PCT/EP2007/051428 mailed Jul. 2, 2007.
"Bluetooth-Adapter vermittelt zwichen Fernseher, HiFi-Turm und Handy" Internet citation dated Mar. 1, 2005, http://www.heise.de/newsticker/meldung/print/56920.
"Sony Ericsson MMV-200" Internet citation dated Mar. 1, 2005, http://www.sonyericsson.com/downloads/MMV200_UG_R2a_Multilingual1.pdf.
International Preliminary Report on Patentability (16 pages) corresponding to International Application No. PCT/EP2007/051428; Mailing Date: Sep. 18, 2008.
"Sony Ericsson MMV-200", Internet Citation Dated Mar. 1, 2005, http://www.sonyericsson.com/downloads/MMV200_UG_R2a_Multilingual1.pdf; XP00791940.
*Bluetooth Media Center MMV-200*, http://www.sonyericsson.com/spg.jsp?cc=us&lc=en&ver=4000&template=pp4_1_1&zone..., 2 pages, dated Jun. 16, 2006.
*Bluetooth Media Center MMV-200*, http://www.sonyericsson.com/spg.jsp?cc=us&lc=en&ver=4000&page=php1_10252&pid=..., 2 pages, dated Jun. 16, 2006.
*La Crosse Technology WT-5120U Projection Alarm Clock with Outdoor Temperature*, http://www.amazon.com/gp/product/B0009VCBB6/002-0090936-3601677?redirect=true, 1 page, dated Aug. 14, 2006.
*Laser Projectors Coming to Cell Phones and PDAs*, http://www.audioholics.com/news/editorials/laserprojectorscellphones.php, 3 pages, dated Aug. 14, 2006.
*Large Format Slide Projection*, http://www.lgfx.co.uk/projection.htm, 2 pages, dated Aug. 14, 2006.
*MMS—Share the good times*, http://www.ericsson.com/mms/, 3 pages, dated Jul. 11, 2005.
*Sony Ericsson Bluetooth Media Center MMV-200*, http://www.mobiletechnews.com/info/2005/03/02/021650.html, 1 page, dated Jun. 16, 2006.
*Sony Ericsson unveils the Bluetooth Media Viewer MMV100 printer friendly*, http://www.pocket-lint.co.uk/printnews.php?newsId=238, 1 page, dated Jul. 11, 2005.
*Trust-Bluetooth information*, http://www.trust.com/service/help/bluetooth/default.aspx, 12 pages, dated Jul. 11, 2005.
de Léon et al., *Mobile Wireless Communication Terminals, Systems, Methods, and Computer Program Products for Managing Playback of Song Files*, U.S. Appl. No. 11/435,023, filed May 16, 2006.
Minör, *Mobile Wireless Communication Terminals, Systems, Methods, and Computer Program Products for Publishing, Sharing and Accessing Media Files*, U.S. Appl. No. 11/442,751, filed May 30, 2006.
Wassingbo, *Mobile Wireless Communication Terminals, Systems and Methods for Providing a Slideshow*, U.S. Appl. No. 11/216,935, filed Aug. 31, 2005.
Wassingbo, *Mobile Wireless Communication Terminals, Systems, Methods and Computer Program Products for Providing a Song Play List*, U.S. Appl. No. 11/212,201, filed Aug. 26, 2005.

* cited by examiner

WIRELESS COMMUNICATION TERMINALS, SYSTEMS, METHODS, AND COMPUTER PROGRAM PRODUCTS FOR MEDIA FILE PLAYBACK

FIELD OF THE INVENTION

The present invention relates to electronic devices and, more particularly, to electronic devices, methods and computer program products for playback of media files.

BACKGROUND OF THE INVENTION

Mobile electronic devices, such as wireless communication terminals (e.g., cellular telephones), are widely used to store and playback media files such as song files. A user may wish to play a media file on a playback device such as a PC or laptop, a television, an audio receiver, etc. This may be accomplished by connecting the electronic device to the playback device via a wireless link (e.g., a Bluetooth connection) if the playback device is equipped with a suitable communication module, which may be an integrated module or an auxiliary (e.g., plug-in) wireless communication module such as the Bluetooth Media Viewer MMV-100 module or Bluetooth Media Viewer MMV-200 module, each available from Sony Ericsson of Sweden. Media files may be sent, one by one, from one or more mobile electronic devices to the communication module, which in turn provides playback signals to the playback device.

SUMMARY OF THE INVENTION

According to embodiments of the present invention, a wireless communication terminal includes a wireless communication module and a controller. The wireless communication module is configured to communicate with other communication terminals over a wireless interface. The controller is configured to establish a connection with at least one participant wireless communication terminal via the wireless communication module, and to operate in each of a direct mode and, alternatively, a play list mode. When the controller is in the direct mode, the controller is responsive to a playback request from a participant wireless communication terminal to execute playback of a participant media file streamed to the wireless communication terminal from the participant wireless communication terminal without queuing the participant media file or a participant media identification corresponding thereto in a play list. When the controller is in the play list mode, the controller is operative to maintain a play list representing media files to be played, to receive a plurality of playback requests from at least one participant wireless communication terminal, each playback request including a participant media identification corresponding to a participant media file stored on the at least one participant wireless communication terminal, to add each participant media identification to the play list, to receive the participant media files from the at least one participant wireless communication terminal, and to execute playback of the participant media files in accordance with the play list.

According to some embodiments, the wireless communication terminal includes a mode selector operable by an operator to selectively set the controller in the direct mode and, alternatively, in the play list mode.

The controller may be configured to retrieve the participant media files from the at least one participant wireless communication terminal for playback when the controller is in the play list mode.

According to some embodiments, the wireless communication terminal includes a memory and the controller is configured to store the participant media files from the at least one participant wireless communication terminal in the memory for playback when the controller is in the play list mode.

The controller may be configured to retrieve and execute the participant media files from the at least one participant wireless communication terminal as a streaming file when the controller is in the play list mode.

According to some embodiments, the controller is configured to send a playback signal to a media player equipment to execute playback of the participant media file(s) on the media player equipment. The wireless communication terminal may be a modular media viewer adapter. In some embodiments, the wireless communication terminal includes a video output configured to communicatively connect the wireless communication terminal to the media player equipment to display the play list on the media player equipment.

According to some embodiments, the wireless communication terminal includes a laser projector configured to project an image onto a remote surface to provide a display. The controller may be configured to control the laser projector to project an image of the play list onto the remote surface to provide a display when the controller is in the play list mode.

According to some embodiments, the media files are song files.

According to some embodiments: the wireless communication module is configured to communicate with other communication terminals over a direct point-to-point wireless interface; and the controller is configured to establish the connection with the participant wireless communication terminal(s) via the wireless communication module, to receive the participant media identifications from the at least one participant wireless communication terminal, and to receive the participant media file(s) from the participant wireless communication terminal(s) for playback all via the direct point-to-point wireless interface. The wireless communication module may include a Bluetooth transmitter.

According to some embodiments, the wireless communication terminal includes a cellular telephone.

According to embodiments of the present invention, a system for playing back media files includes at least one participant wireless communication terminal and a host wireless communication terminal. The host wireless communication terminal includes a wireless communication module and a controller. The wireless communication module is configured to communicate with other communication terminals over a wireless interface. The controller is configured to establish a connection with the at least one participant wireless communication terminal via the wireless communication module, and to operate in each of a direct mode and, alternatively, a play list mode. When the controller is in the direct mode, the controller is responsive to a playback request from a participant wireless communication terminal to execute playback of a participant media file streamed to the wireless communication terminal from the participant wireless communication terminal without queuing the participant media file or a participant media identification corresponding thereto in a play list. When the controller is in the play list mode, the controller is operative to maintain a play list representing media files to be played, to receive a plurality of playback requests from at least one participant wireless communication terminal, each playback request including a participant media identification corresponding to a participant media file stored on the at least one participant wireless communication terminal, to add each participant media identification to the play list, to receive the participant media files from the at least one participant wireless communication terminal, and to execute playback of the participant media files in accordance with the play list.

According to method embodiments of the present invention, a method for playing back media files using a host wireless communication terminal includes: establishing a wireless connection between the host wireless communication terminal and a participant wireless communication terminal; receiving a selection from an operator between a direct mode and, alternatively, a play list mode of the host wireless communication terminal; and a) if the direct mode is selected: receiving a playback request from a participant wireless communication terminal; and responsive to the playback request, executing playback of a participant media file streamed to the wireless communication terminal from the participant wireless communication terminal without queuing the participant media file or a participant media identification corresponding thereto in a play list; and b) if the play list mode is selected: maintaining a play list using the host wireless communication terminal, the play list representing media files to be played; receiving at the host wireless communication terminal a plurality of participant media identifications from at least one participant wireless communication terminal, wherein each participant media identification corresponds to a participant media file stored on the at least one participant wireless communication terminal; adding the participant media identifications to the play list; and executing playback of the participant media files represented by the play list.

According to further embodiments of the present invention, a wireless communication terminal includes a laser projector configured to project an image onto a remote surface to provide a display. The wireless communication terminal is a modular media viewer adapter.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
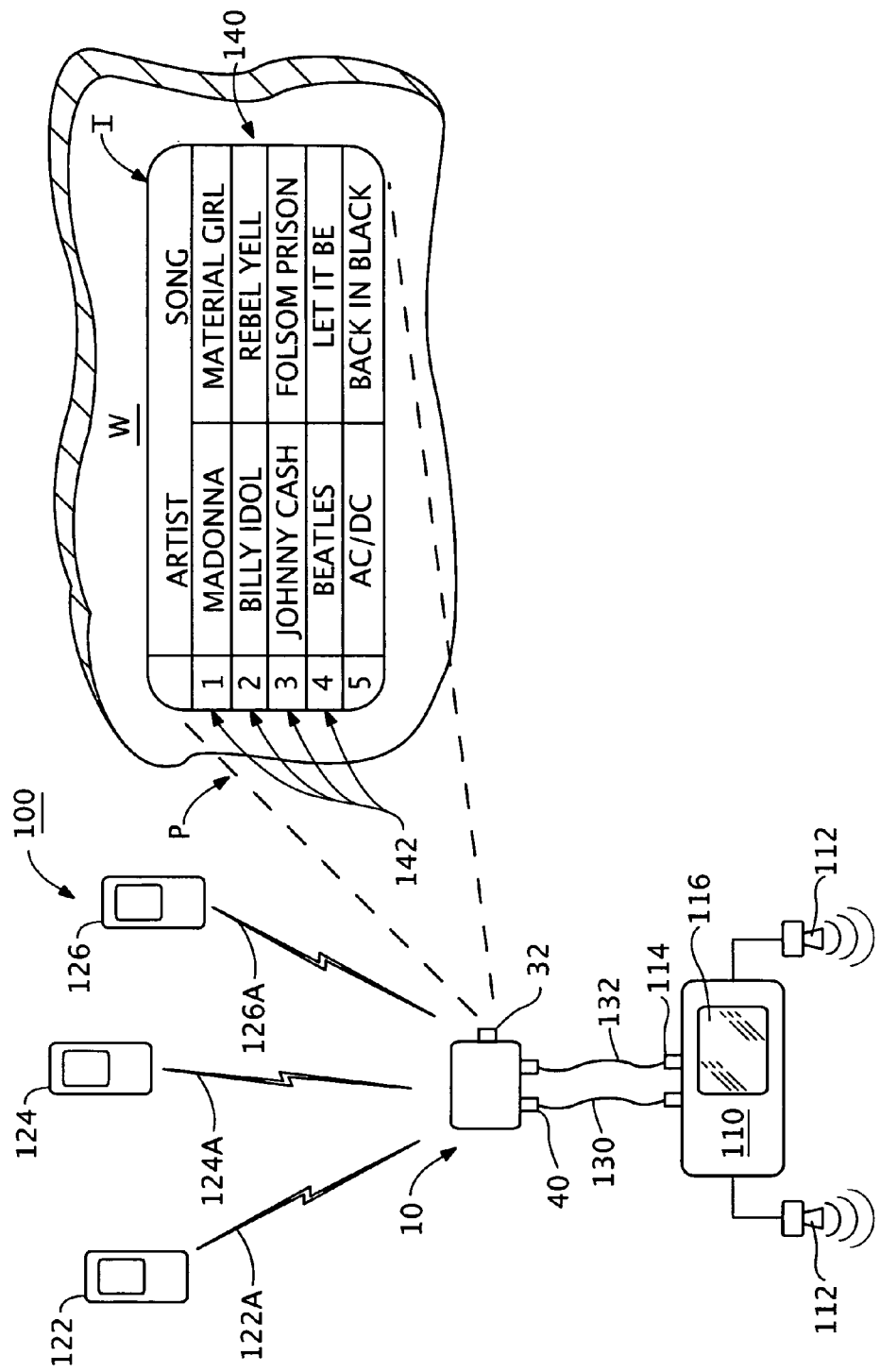
FIG. 1 is a schematic view of a media file playback system according to embodiments of the present invention.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof. As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Well-known functions or constructions may not be described in detail for brevity and/or clarity.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, "electronic component" means an active device as contrasted with a passive electrical connector or the like. An electronic component may include a processor.

As used herein, "streamed" or "streaming" means that a file, such as a media file (e.g., an audio or song file, a video file, or an image file), is continuously sent via a digital signal to a receiving device where the media file is concurrently played via a suitable receiving application. The digital signal may be buffered.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Some embodiments of the present invention will now be described below with respect to FIGS. 1-4. Some embodiments of the present invention provide wireless communication terminals, systems and methods capable of coordinating and facilitating playback of media files. Each media file may be an audio or song file, a video clip or video file, or a still image file, for example.

Figure 4:
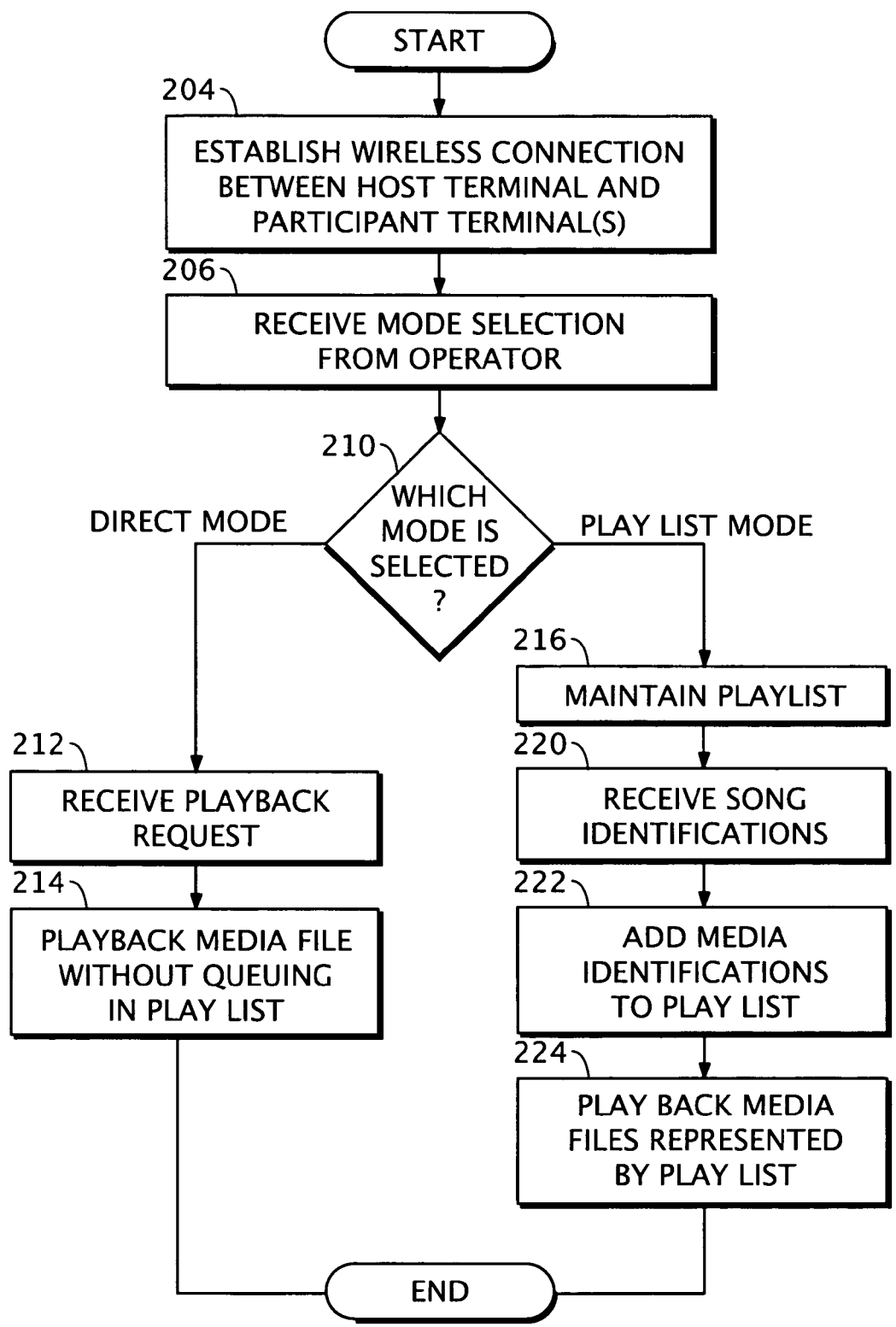
FIG. 4 is a flow chart illustrating methods according to embodiments of the present invention.

A method for playing back a media file according to some embodiments of the present invention will now be described with reference to the flowchart of FIG. 4. Referring to the embodiments of FIG. 4, the method includes establishing a wireless connection between a host wireless communication terminal and a participant wireless communication terminal (Block 204). A selection is received from an operator between a direct mode and, alternatively, a play list mode of the host wireless communication terminal (Block 206). A determination is made as to which mode has been selected (Block 210).

If the direct mode is selected, a playback request is received from a participant wireless communication terminal (Block 212). Responsive to the playback request, playback of a participant media file streamed to the wireless communication terminal from the participant wireless communication terminal is executed without queuing the participant media file or a participant media identification corresponding thereto in a play list (Block 214).

If, alternatively, the play list mode is selected, a play list is maintained using the host wireless communication terminal (Block 216). The play list represents media files to be played. A plurality of participant media identifications are received at the host wireless communication terminal from at least one participant wireless communication terminal (Block 220). Each participant media identification corresponds to a participant media file stored on the at least one participant wireless communication terminal. The participant media identifications are added to the play list (Block 222). Playback of the participant media files represented by the play list is executed (Block 224).

According to some embodiments, when the host wireless communications terminal is in the play list mode, connections are established between the host wireless communication terminal and the participant wireless communication terminals, and the host wireless communication terminal receives a plurality of participant media identifications from the plurality of participant wireless communication terminals, adds each of the participant media identifications to the play list, and retrieves the participant media files from each of the respective participant wireless communication terminals for playback.

According to some embodiments, communication between the host wireless communication terminal and each participant wireless communication terminal is accomplished via a direct point-to-point interface, such as a Bluetooth wireless RF connection. According to some embodiments, communication between the host wireless communication terminal and each participant wireless communication terminal is accomplished via an indirect interface, such as through a WLAN. Further aspects and embodiments of the present invention will be apparent from the following descriptions of further embodiments.

Referring now to FIG. 1, a media file playback system 100 in accordance with some embodiments of the present invention is illustrated therein. The system 100 includes a wireless communication terminal 10 (also referred to herein as the "host wireless communication terminal" or "host terminal"), a plurality of additional wireless communication terminals 122, 124, 126 (also referred to herein as the "participant wireless communication terminals" or "participant terminals"), and a media player device or equipment 110. According to some embodiments, the system 100 is used to enable, coordinate and execute playback of song files, and the system 100 and related methods will be described with regard to song files as the media files. However, according to other embodiments, the system 100 and related methods may be used to enable, coordinate and execute playback of other types of media files instead of or in addition to song files, and it will be appreciated that the description that follows also applies to such other media file types with suitable modifications.

The host terminal 10 is configured to communicate data with one or more of the other wireless terminals 122, 124, 126 over direct wireless communication interfaces 122A, 124A, 126A therebetween and/or over another wireless communication interface through a wireless local area network (WLAN) router. The host terminal 10 is connected to the media player equipment 110 by signal wires or cables 130, 132. According to some embodiments, the host terminal 10 may additionally or alternatively communicate with the media player equipment 110 over a direct wireless communication interface.

As discussed in more detail below, the host terminal 10 may project a projection P onto a surface such as a wall W to provide a display image I thereon. The display image I may include a media file play list 140 (e.g., a song file play list) as discussed herein.

Figure 2:
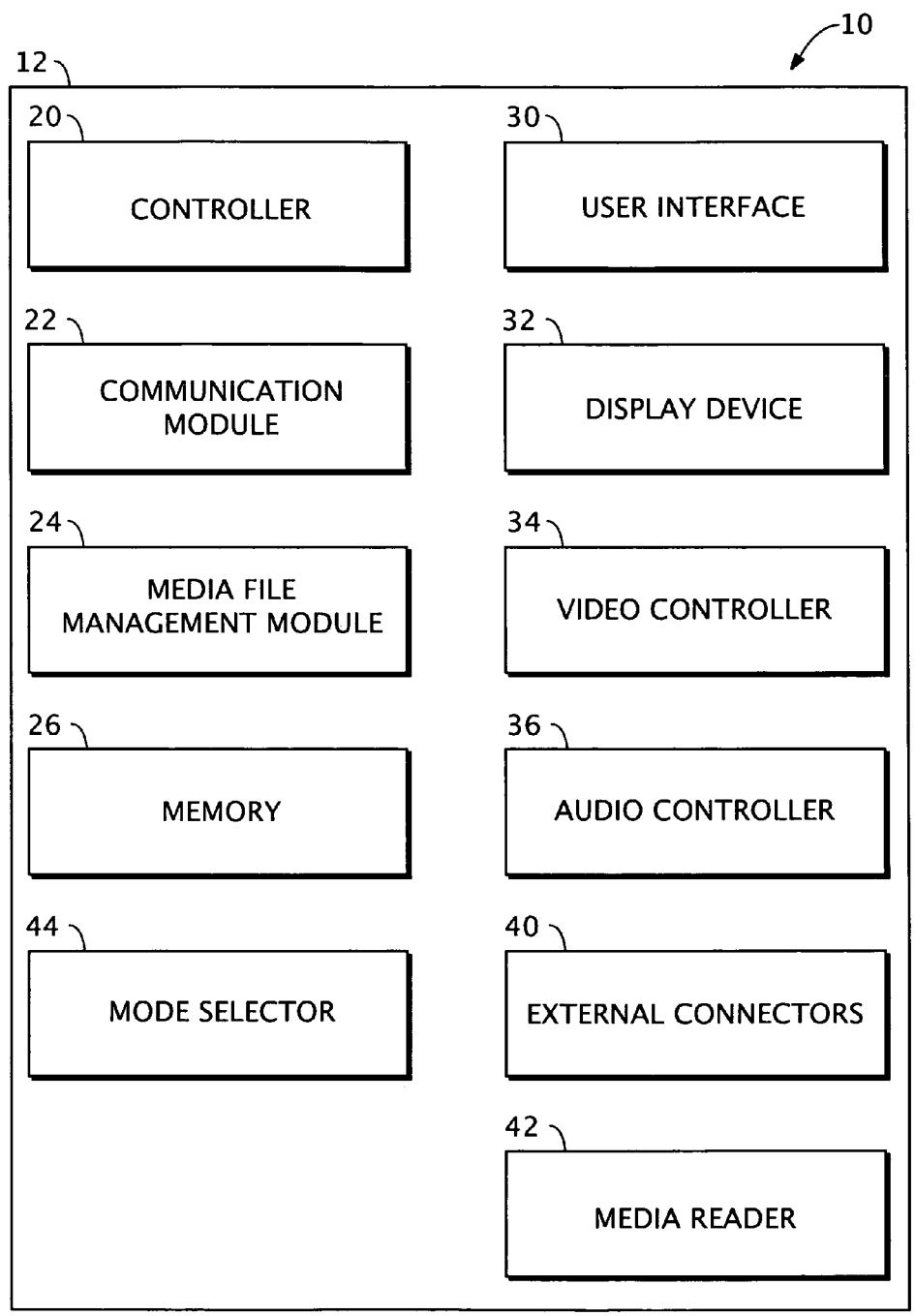
FIG. 2 is a schematic block diagram of a host wireless communication terminal of the media file playback system of FIG. 1.
Figure 3:
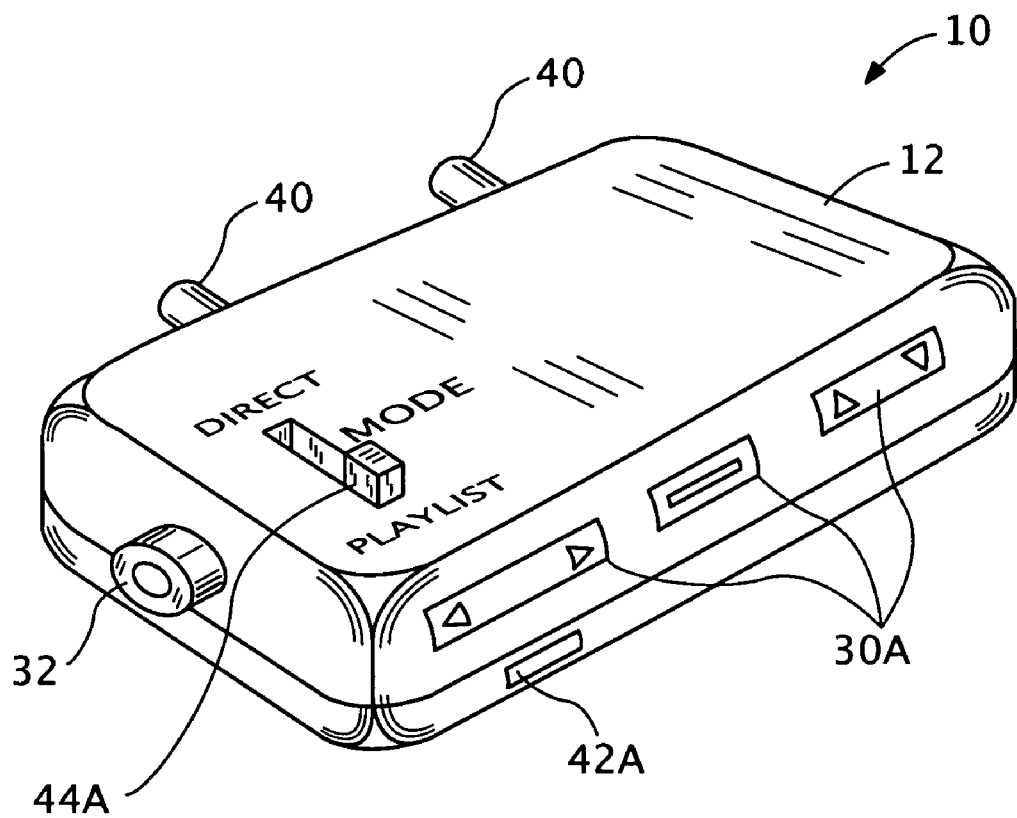
FIG. 3 is a perspective view of the host wireless communication terminal of FIG. 2.

With reference to FIGS. 2 and 3, an exemplary embodiment of the host terminal 10 is shown in more detail therein. According to some embodiments, the host terminal 10 is a modular media viewer adapter. The host terminal 10 includes a portable housing assembly 12, a controller 20, a wireless communication module 22, a media file management module 24, a memory 26, a user interface 30 (i.e., a man machine interface (MMI)), a display device 32, a video controller 34 (e.g., a video card), an audio controller 36 (e.g., an audio card), external connectors 40 (e.g., a video output connector and an audio output connector), a media reader 42, and a mode selector 44.

The housing assembly 12 may be formed of any suitable material. According to some embodiments, the housing assembly 12 has a total volume of no more than 300 cc.

The user interface 30 may include any suitable input device (s) including, for example, input buttons 30A (FIG. 3). Further suitable input devices may include a touch activated or touch sensitive device (e.g., a touch screen), a joystick, a keyboard/keypad, a dial, a directional key or keys, and/or a pointing device (such as a mouse, trackball, touch pad, etc.).

The controller 20 may support various functions of the host terminal 10. The controller 20 can be any commercially available or custom microprocessor, for example. In use, the controller 20 of the host terminal 10 generates a signal to the display device 32, the video controller 34, the audio controller 36, and/or the external connectors 40.

The memory 34 is configured to store digital information signals and data such as a digital audio signal and/or digital audio files.

According to some embodiments, the display device 32 is a projector. According to some embodiments, the display device 32 is a laser projector. The display device 32 may include a light emitting diode (LED), liquid crystal on silicon (LCOS) or LCD display backlit or reflectively lit by one or more LEDs, laser diodes or lasers. The display device 32 may include suitable electronics, an image generator, and lens(es) to convert the display signals from the controller 20 to the projection P. Alternatively or additionally, the host terminal 10 may include a display screen such as a liquid crystal display (LCD) with or without auxiliary lighting (e.g., a lighting panel).

The media reader 42 may be any suitable device for reading a media file from a storage medium. For example, the media reader 42 may be configured to read a memory stick, MMC, MD, SD or compact flash card. A slot 42A (FIG. 3) may be provided to receive a memory card.

The mode selector 44 is operable to change the controller 20 between modes as described herein. The mode selector 44 may include user accessible and operable switch mechanism such as a slide switch 44A (FIG. 3), for example. Other types of switches may be provided. Indicia such as "DIRECT" and "PLAYLIST" may be provided to assist an operator in positioning the slide switch 44A for mode selection.

The communication module 22 is configured to communicate data over one or more of the wireless interfaces 122A, 124A, 126A to and from the remote wireless terminals 122, 124, 126 as discussed herein. The communication module 22 can include a direct point-to-point connection module and/or a WLAN module.

A direct point-to-point connection module may include a direct RF communication module or a direct IR communication module. The direct RF communication module may include a Bluetooth module. With a Bluetooth module, the host terminal 10 can communicate via an ad-hoc network through a direct point-to-point interface.

With a WLAN module, the host terminal 10 can communicate through a WLAN (e.g., a router) using a communication protocol that may include, but is not limited to, 802.11a, 802.11b, 802.11e, 802.11g, and/or 802.11i.

The communication module 22 may include a short range transmitter and receiver, such as a Bluetooth transmitter and receiver and an antenna. The antenna may be an embedded antenna, a retractable antenna or any antenna known to those having skill in the art without departing from the scope of the present invention. The radio frequency signals transmitted between the host terminal 10 and the other terminals may include both traffic and control signals that are used to establish and maintain communication with another party or destination. In addition, the transceiver may include an infrared (IR) transceiver configured to transmit/receive infrared signals to/from other electronic devices via an IR port.

The host terminal 10 may also be configured to electrically couple with another terminal via a wireline or cable for the transmission of digital communication signals therebetween.

The cables 130, 132 may be of any suitable construction. According to some embodiments, the cables are terminated with RCA connectors or a 3.5 mm mini-jack connector on the end to be connected to the media player equipment 110.

The terminals 122, 124, 126 may be any suitable wireless communication terminals capable of wirelessly communicating with the host terminal 10. According to some embodiments, the terminals 122, 124, 126 each include a wireless communication module that enables direct point-to-point wireless communication and, according to some embodiments, a Bluetooth interface. The communication module may be integrated into each terminal 122, 124, 126 or embodied in an adapter (e.g., a Bluetooth streaming transmitter adapter) operatively connected to the terminal. The terminals 122, 124, 126 are configured to provide media files to the host terminal 10 in accordance with suitable communications profiles. According to some embodiments, the terminals 122, 124, 126 are enabled for streaming media files in accordance with the Bluetooth Advanced Audio Distribution Profile (A2DP). According to some embodiments, the terminals 122, 124, 126 are configured to download media files in accordance with the Bluetooth Object Exchange (OBEX) communications protocol.

According to some embodiments, all or some of the terminals 122, 124, 126 are mobile wireless communication terminals. According to some embodiments, all or some of the terminals 122, 124, 126 are handheld mobile wireless communication terminals. According to some embodiments all or some of the terminals 122, 124, 126 are cellular telephones. The terminals 122, 124, 126 may also be or include computers, portable music players, and/or PDAs.

The media player equipment 110 includes apparatus adapted to convert an audio signal (e.g., a digital or analog audio signal) to corresponding sound. The media player equipment 110 may include, for example, a PC or laptop, a television, an audio receiver, stereo equipment, etc. The illustrated media player equipment 110 includes sound transducers (speakers) 112. The illustrated media player equipment 110 also includes a display screen (e.g., a CRT, LCD, plasma, etc. display) 116. The media player equipment 110 has connectors 114 for operatively engaging a video connector cable 130 and an audio connector cable 132 from the host terminal 10. Alternatively, the host terminal 10 can be wirelessly communicatively coupled to the media player equipment 110.

The system 100 and methods of operation will now be described using an illustrative example of use. The host terminal 10 is connected to the media player equipment 110 by interconnecting the wires 130, 132 to the connectors 40, 114. A group of users at a gathering each have a respective one of the terminals 122, 124, 126. Various song files are stored on one or more (typically two or more) of the terminals 122, 124, 126. The users may wish to share the songs stored on their mobile terminals with the other users at the gathering by playing their songs on the media player equipment 110. Using the host terminal 10, this may be accomplished in one of two ways. Generally, song files can be sent to and played back by the host terminal 10 in a "direct mode" or, alternatively, in a "play list mode". The operator can select the mode and the controller determines the mode setting. In the direct mode, each user sends (via Bluetooth, etc.) his or her songs (i.e., music audio files) to the media playback equipment 110 one at a time, song by song. In the play list mode, the host terminal 10 maintains a play list of song files to be played. Each user sends his or her song files or song file identifications to the host terminal 10, which adds the song file identifications to the play list and subsequently plays the song files in accordance with the play list.

In order to use the direct mode, the operator moves the switch 44A of the mode selector 44 to a direct mode position, thereby putting the host terminal 10 in the direct mode. One of the wireless participant terminals 122, 124, 126 (for example, the wireless participant terminal 122) wirelessly sends a song playback request to the host terminal 10. In response, the controller 20 of the host terminal 10 establishes a wireless connection (i.e., communicatively couples) with the participant terminal 122. According to some embodiments the wireless connection is a direct wireless communication interface connection, according to some embodiments, a direct RF connection and, according to some embodiments, a Bluetooth connection. The connection may be established in known manner.

The participant terminal 122 then wirelessly sends the song file to the host terminal 10 via the wireless connection. According to some embodiments, the song file is streamed (e.g., using A2DP) from the participant terminal 122 to the host terminal 10. The controller 20 of the host terminal 10 then executes playback of the song file by sending the song file to the media playback equipment 110. According to some embodiments, the host terminal 10 converts the digital song file to an analog playback signal and sends the analog signal to the media playback equipment 110.

According to some embodiments, the song file is streamed to the media playback equipment 110, for example, as the song file is streamed from the originating participant terminal 122 to the host terminal 10. According to some embodiments, the song file is played live (i.e., the song file is streamed from the host terminal 10 to the media playback equipment 110 as it is received by streaming from the participant terminal 122). According to some embodiments, the song file is not stored on or queued in the host terminal 10. According to some embodiments, neither the song file nor an identification thereof is added to a play list of song files for subsequent playback. Rather, the song file is played back directly. According to some embodiments, the host terminal 10 may buffer the streamed song file to facilitate smooth or uniform playback.

According to some embodiments, the host terminal 10 hosts only one participant terminal at a time. According to some embodiments, the host terminal 10 will continue to playback the song file from the participant terminal 122 until the wireless connection with the participant terminal 122 is cut or a new song playback request is received from the participant terminal 122 or another of the participant terminals 124, 126.

According to some embodiments, the participant does not have to actively send a song title each time the previous song ends. Rather, whatever song file is played on the participant terminal is automatically distributed or transmitted to the host terminal 10. According to some embodiments, each song file is automatically streamed to the host terminal 10 according to the A2DP Bluetooth profile.

In order to use the play list mode, the operator moves the switch 44A of the mode selector 44 to a play list mode position, thereby putting the host terminal 10 in the play list mode. One or more of the wireless participant terminals 122, 124, 126 wirelessly sends a respective song playback request to the host terminal 10. In response, the controller 20 of the host terminal 10 establishes a wireless connection (i.e., communicatively couples) with each requesting participant terminal 122, 124, 126. According to some embodiments the wireless connection is a direct wireless communication interface connection, according to some embodiments, a direct RF connection and, according to some embodiments, a Bluetooth connection. The connection may be established in known manner.

Along with the song playback request or once the connections are established between the host terminal 10 and the participant terminals 122, 124, 126, each participant can send a participant song identification designating a song stored on the participant's terminal 122, 124, 126. The host terminal 10 receives the participant song identifications from the participant terminals 122, 124, 126. The song identifications may be received in turn, for example, and each participant terminal 122, 124, 126 may send more than one song identification. With the host terminal 10 in the play list mode, the media file management module 24 of the host terminal 10 creates and maintains a host play list of these song identifications. The host play list represents song files to be played. A song file corresponding to each participant song identification of the play list is sent by the participant terminal 122, 124, 126 that requested playback of the song file to the host terminal 10. The host terminal 10 thereafter plays each song file in accordance with the play list by generating a playback signal via the audio controller 36 to the media playback equipment 110. Typically, the host terminal 10A will execute playback of the song files in the listed sequence unless a random or other non-sequential mode is in effect. According to some embodiments, the request and song file signals between the host terminal and the participant terminal are sent wirelessly and, according to some embodiments, via a direct wireless RF connection such as Bluetooth.

According to some embodiments (referred to herein for convenience as "Option A"), when in the play list mode, the host terminal 10 is configured to store the song files corresponding to the participant song identifications of the play list at the outset. For each song identification, the participant sends the song file (e.g., using OBEX), which is stored in the memory 26 to await playback. Thus, a plurality of these song files may be stored in the memory 26 at once awaiting playback in accordance with the playlist. When the corresponding song identification comes up in the queue or rotation of the play list, the controller 20 executes playback of the stored song file as discussed above. According to some embodiments, the stored song file is automatically erased once it has been played. This configuration may be advantageous in that it is not necessary for the associated participant terminal to be located within wireless transmission range when the song file is to be played back.

According to some embodiments (referred to herein for convenience as "Option B"), when in the play list mode, the host terminal 10 is configured to store each participant song identification of the play list and the address of the participant terminal that submitted the song identification. When a song identification arrives in the queue to be played, the controller 20 of the host terminal 10 will identify the song identification that is to be played thereafter. The song identification identified may be the song identification that is to be played next. The host terminal 10 will then send a song file request to the corresponding one of the participant terminals 122, 124, 126 to retrieve the song file corresponding to the song identification. The corresponding participant terminal 122, 124, 126 will then send a copy of the identified song file (which is stored on the participant terminal) to the host terminal 10. According to some embodiments, the participant terminal sends (e.g., using OBEX) the song file to the host terminal 10 as a copy of the song file that is then temporarily stored on the host terminal 10 (e.g., in the memory 26). According to other embodiments, the participant terminal sends the song file to the host terminal 10 as a streaming song file (e.g., using A2DP).

It may be preferable or necessary to stream the song file from the participant terminal to the host terminal and/or from the host terminal to the media player equipment 110 if the allocated memory space on the host terminal 10 is insufficient and/or storage of the song file on the host terminal 10 is prevented or illegal. According to some embodiments, the song file, whether streamed or stored in whole, will be automatically erased (i.e., without user intervention) from the host terminal 10 during or after playback.

The controller 20 of the host terminal 10 may execute the foregoing steps for each song identification in the play list in turn and automatically (i.e., without user intervention). According to some embodiments, the participant terminals 122, 124, 126 can add new song identifications to the song list as the controller 20 of the host terminal 10 runs through the play list. According to some embodiments, new participant terminals can submit song identifications as the host terminal 10 runs through the play list.

According to some embodiments (referred to herein for convenience as "Option C"), when in the play list mode, the host terminal 10 is configured to store the song file corresponding to each participant song identification of the play list as described above ("Option A") up to a memory limit. Once the memory limit is reached, the host terminal 10 stores each subsequent submission or request (which may be referred to as "overflow song identifications") by its participant song identification and address of the participant terminal that submitted the song identification as described above ("Option B"). The song files stored in the memory 26 are played back from the memory in accordance with the play list. The song files (which may be referred to as "overflow song files") corresponding to the overflow song identifications are retrieved from the respective participant terminals 122, 124, 126 as described above ("Option B"). According to some embodiments, the overflow song files are retrieved as they come up for playback in the play list. According to some embodiments, the song files of the play list are erased from the memory 26 as or after they are played back, and the overflow song files are retrieved and stored in the memory 26 as sufficient space is freed up in the memory 26. According to some embodiments, the overflow song files are streamed for direct playback when they come up for playback in the play list.

According to some embodiments, the host terminal 10 is configured to enable the operator to select between the Option A, Option B, and/or Option C configurations or submodes. According to some embodiments, the host terminal 10 is preconfigured in only one of the Option A, Option B, and Option C configurations or submodes.

As illustrated, the host terminal 10 communicates with the participant terminals 122, 124, 126 via direct point-to-point wireless interfaces or links 122A, 124A, 126A, respectively. According to some embodiments, one or more of the participant terminals 122, 124, 126 communicate with the host terminal 10 via wireless interfaces or links through a WLAN router. It will be appreciated that, according to some embodiments, the interfaces may be various combinations of wireless interfaces that are direct (e.g., Bluetooth) or indirect (e.g., via a WLAN router). According to some contemplated embodiments, all of the signals provided between the host terminal 10 and the participant terminals 122, 124, 126 to execute the song sharing procedure are provided via direct point-to-point wireless interfaces. According to some contemplated embodiments, all of the signals provided between the host terminal 10 and the participant terminals to execute the song sharing procedure are provided via direct wireless radio frequency (RF) interfaces such as Bluetooth interfaces.

As discussed above, the host terminal 10 may project a projection P onto a surface such as the wall W via the projector 32 to provide a display image I thereon. The display image I may include the song file play list 140 as generated and maintained by the controller 20. As illustrated, the displayed play list includes a plurality of song identifications 142 that are a being played or will be played in the appropriate sequence. The projected image I may be relatively large (e.g., as compared to an LCD display screen on the host terminal 10 itself), permitting multiple participants or others to conveniently view the play list. The host terminal 10 may additionally or alternatively include an onboard display screen (e.g., an LCD display screen). The host terminal 10 may additionally or alternatively generate video signals via the video controller 34 to the media player equipment 110, which converts the video signals to a display on the video display screen 116.

The system 100 can provide a convenient and enjoyable mechanism for playing songs selected by a group of people. In the direct mode, a song file can be played by contemporaneously streaming the song file to the host terminal. In the play list mode, the system 100 provides playback execution functionality and also allows the host terminal to create and use the song play list. In practice, for example, partygoers can add songs from their own participant terminals to a song play list maintained on a host terminal. When their song's turn arrives in the playback sequence, a song file stored on the host terminal will be automatically played or a copy of the song file will automatically be sent to the host terminal and played. Thus, the partygoer need not take any further action. When, in accordance with some embodiments, the request and song transfer signals are communicated between the host terminal and the participant terminal via a direct wireless connection (e.g., an RF interface such as a Bluetooth connection), the partygoer may simply place his or her participant terminal in a pocket or handbag.

The application programs described herein, including the media file management module 24, are illustrative of programs that implement various features according to embodiments of the present invention. It will be appreciated that other and/or additional application programs may be employed in accordance with embodiments of the present invention.

Although FIG. 2 illustrates an exemplary hardware/software architecture that may be used in a host terminal for management and playback of media files, it will be understood that the present invention is not limited to such a configuration but is intended to encompass any configuration capable of carrying out operations described herein. For example, although the memory 26 is illustrated as separate from the controller 20, the memory 26 or portions thereof may be considered as a part of the controller 20. More generally, while particular functionalities are shown in particular blocks by way of illustration, functionalities of different blocks and/or portions thereof may be combined, divided, and/or eliminated. Moreover, the functionality of the hardware/software architecture of FIG. 2 may be implemented as a single processor system or a multi-processor system in accordance with various embodiments of the present invention.

While the host terminal 10 as illustrated is configured as a modular adapter, the host terminal may be otherwise constructed in accordance with further embodiments of the present invention. According to some embodiments, the wireless communication terminal 10 may be integrated with the media player equipment 110.

According to still further embodiments, the host terminal is a mobile radiotelephone that can form a part of a radiotelephone communication system. For example, the radiotelephone communication system may include the mobile radiotelephone and a base station transceiver, which is part of a wireless communications network. In some embodiments of the present invention, the wireless communications network includes a base station transceiver that includes the radio transceiver(s) that define an individual cell in a cellular network and communicates with the mobile radiotelephone and other mobile terminals in the cell using a radio-link protocol. It will be understood that, in some embodiments of the present invention, many base station transceivers may be connected through, for example, a mobile switching center and other devices to define the wireless communications network.

The mobile radiotelephone may be configured and operable in the manner described herein with regard to the host terminal 10. The mobile radiotelephone may further include a display and MMI (e.g., keypad) suited for radiotelephone use. The display may be a laser projection display as described herein or a localized display such as an LCD display screen.

The mobile radiotelephone may include a cellular communication module (which may include or form a part of the communication module 22) configured to enable communication over a cellular communications wireless interface. With the cellular communication module, the mobile radiotelephone can communicate via the base station(s) of the wireless communications network using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

The cellular communication module can include a transceiver typically having a transmitter circuit and a receiver circuit, which respectively transmit outgoing radio frequency signals (e.g., to the wireless communications network) and receive incoming radio frequency signals (e.g., from the wireless communications network), such as voice and data signals, via an antenna. The radio frequency signals transmitted between the mobile radiotelephone and the wireless communications network may include both traffic and control signals (e.g., paging signals/messages for incoming calls), which are used to establish and maintain communication with another party or destination. The radio frequency signals may also include packet data information, such as, for example, cellular digital packet data (CDPD) information.

According to some embodiments, the host terminal is a mobile terminal. According to some embodiments, the host terminal is a handheld mobile terminal. According to some embodiments, the host terminal is a handheld mobile terminal. By "handheld mobile terminal," it is meant that the outer dimensions of the mobile terminal are adapted and suitable for use by a typical operator using one hand. According to some embodiments, the total volume of the handheld mobile terminal is less than about 200 cc. According to some embodiments, the total volume of the handheld terminal is less than about 100 cc. According to some embodiments, the total volume of the handheld mobile terminal is between about 50 and 100 cc. According to some embodiments, no dimension of the handheld mobile terminal exceeds about 200 mm. According to some embodiments, the handheld mobile terminal is a mobile radiotelephone as described above.

As discussed above, the media files may be video files or still image files in addition to or instead of audio or song files. Accordingly, the features, processes, methods, systems and the like described herein with respect to the methods and systems for sharing song files can likewise be employed for sharing video files and still image files.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A wireless communication terminal comprising:
   a wireless communication module including a receiver and a transmitter that is configured to communicate with other communication terminals over a wireless interface;
   a controller comprising a microprocessor that is configured to establish a connection with at least one participant wireless communication terminal via the wireless communication module, and to operate in each of a direct mode and, alternatively, a play list mode, wherein:
      when the controller is in the direct mode, the controller is responsive to a playback request from a participant wireless communication terminal to execute playback of a participant media file streamed to the wireless communication terminal from the participant wireless communication terminal without queuing the participant media file or a participant media identification corresponding thereto in a play list; and
      when the controller is in the play list mode, the controller is operative to maintain a play list representing media files to be played, to receive a plurality of playback requests from at least one participant wireless communication terminal, each playback request including a participant media identification corresponding to a participant media file stored on the at least one participant wireless communication terminal, to add each participant media identification to the play list, to receive the participant media files from the at least one participant wireless communication terminal, and to execute playback of the participant media files in accordance with the play list.

2. The wireless communication terminal of claim 1 including a mode selector operable by an operator to selectively set the controller in the direct mode and, alternatively, in the play list mode.

3. The wireless communication terminal of claim 1 wherein the controller is configured to retrieve the participant media files from the at least one participant wireless communication terminal for playback when the controller is in the play list mode.

4. The wireless communication terminal of claim 1 including a memory and wherein the controller is configured to store the participant media files from the at least one participant wireless communication terminal in the memory for playback when the controller is in the play list mode.

5. The wireless communication terminal of claim 1 wherein the controller is configured to retrieve and execute the participant media files from the at least one participant wireless communication terminal as a streaming file when the controller is in the play list mode.

6. The wireless communication terminal of claim 1 wherein the controller is configured to send a playback signal to media player equipment to execute playback of the participant media file(s) on the media player equipment.

7. The wireless communication terminal of claim 6 wherein the wireless communication terminal is a modular media viewer adapter.

8. The wireless communication terminal of claim 6 including a video output configured to communicatively connect the wireless communication terminal to the media player equipment to display the play list on the media player equipment.

9. The wireless communication terminal of claim 1 including a laser projector configured to project an image onto a remote surface to provide a display.

10. The wireless communication terminal of claim 9 wherein the controller is configured to control the laser projector to project an image of the play list onto the remote surface to provide a display when the controller is in the play list mode.

11. The wireless communication terminal of claim 1 wherein the media files are song files.

12. The wireless communication terminal of claim 1 wherein:
   the wireless communication module is configured to communicate with other communication terminals over a direct point-to-point wireless interface; and
   the controller is configured to establish the connection with the participant wireless communication terminal(s) via the wireless communication module, to receive the participant media identifications from the at least one participant wireless communication terminal, and to receive the participant media file(s) from the participant wireless communication terminal(s) for playback all via the direct point-to-point wireless interface.

13. The wireless communication terminal of claim 12 wherein the wireless communication module includes a Bluetooth transmitter.

14. The wireless communication terminal of claim 1 wherein the wireless communication terminal includes a cellular telephone.

15. The wireless communication terminal of claim 1 wherein:
   when the controller is in the direct mode, the controller is responsive to a playback request from a participant wireless communication terminal to contemporaneously execute playback of a participant media file streamed to the wireless communication terminal from the participant wireless communication terminal without queuing the participant media file or a participant media identification corresponding thereto in a play list.

16. A system for playing back media files, the system comprising:
   at least one participant wireless communication terminal;
   a host wireless communication terminal, wherein the host wireless communication terminal includes:
      a wireless communication module including a receiver and a transmitter that is configured to communicate with other communication terminals over a wireless interface; and
      a controller comprising a microprocessor that is configured to establish a connection with the at least one participant wireless communication terminal via the wireless communication module, and to operate in each of a direct mode and, alternatively, a play list mode, wherein:
         when the controller is in the direct mode, the controller is responsive to a playback request from a participant wireless communication terminal to execute playback of a participant media file streamed to the wireless communication terminal from the participant wireless communication terminal without queuing the participant media file or a participant media identification corresponding thereto in a play list; and
         when the controller is in the play list mode, the controller is operative to maintain a play list representing media files to be played, to receive a plurality of playback requests from at least one participant wireless communication terminal, each playback request including a participant media identification corresponding to a participant media file stored on the at least one participant wireless communication terminal, to add each participant media identification to the play list, to receive the participant media files from the at least one participant wireless communication terminal, and to execute playback of the participant media files in accordance with the play list.

17. The system of claim 16 wherein:

the wireless communication module is configured to communicate with other communication terminals over a direct point-to-point wireless interface; and the controller is configured to establish the connection with the participant wireless communication terminal(s) via the wireless communication module, to receive the participant media identifications from the at least one participant wireless communication terminal, and to receive the participant media file(s) from the participant wireless communication terminal(s) for playback all via the direct point-to-point wireless interface.

18. The system of claim 16 wherein:

when the controller is in the direct mode, the controller is responsive to a playback request from a participant wireless communication terminal to contemporaneously execute playback of a participant media file streamed to the wireless communication terminal from the participant wireless communication terminal without queuing the participant media file or a participant media identification corresponding thereto in a play list.

19. The system of claim 16 wherein the at least one participant wireless communication terminal is handheld.

20. The system of claim 16 wherein:

the at least one participant wireless communication terminal is handheld;

when the controller is in the direct mode, the controller is responsive to a playback request from a participant wireless communication terminal to contemporaneously execute playback of a participant media file streamed to the wireless communication terminal from the participant wireless communication terminal without queuing the participant media file or a participant media identification corresponding thereto in a play list;

the wireless communication module is configured to communicate with other communication terminals over a direct point-to-point wireless interface; and the controller is configured to establish the connection with the participant wireless communication terminal(s) via the wireless communication module, to receive the participant media identifications from the at least one participant wireless communication terminal, and to receive the participant media file(s) from the participant wireless communication terminal(s) for playback all via the direct point-to-point wireless interface.

21. A method for playing back media files using a host wireless communication terminal, the method comprising:

establishing a wireless connection between the host wireless communication terminal and a participant wireless communication terminal;

receiving a selection from an operator between a direct mode and, alternatively, a play list mode of the host wireless communication terminal; and a) if the direct mode is selected:

receiving a playback request from a participant wireless communication terminal; and responsive to the playback request, executing playback of a participant media file streamed to the wireless communication terminal from the participant wireless communication terminal without queuing the participant media file or a participant media identification corresponding thereto in a play list; and b) if the play list mode is selected:

maintaining a play list using the host wireless communication terminal, the play list representing media files to be played;

receiving at the host wireless communication terminal a plurality of participant media identifications from at least one participant wireless communication terminal, wherein each participant media identification corresponds to a participant media file stored on the at least one participant wireless communication terminal;

adding the participant media identifications to the play list; and executing playback of the participant media files represented by the play list.

\* \* \* \* \*